US012169065B2

(12) United States Patent
Talas et al.

(10) Patent No.: US 12,169,065 B2
(45) Date of Patent: *Dec. 17, 2024

(54) ILLUMINATED EMBLEM ASSEMBLIES AND METHODS OF MANUFACTURE

(71) Applicant: SRG Global Liria, S.L., Liria (ES)

(72) Inventors: Dalibor Talas, Banbury (GB); Yannick Gouedard, Worcestershire (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/632,363

(22) Filed: Apr. 11, 2024

(65) Prior Publication Data

US 2024/0255117 A1     Aug. 1, 2024

Related U.S. Application Data

(63) Continuation of application No. 17/738,064, filed on May 6, 2022, now Pat. No. 11,982,437.

(Continued)

(51) Int. Cl.
*F21V 5/00*     (2018.01)
*B29D 11/00*     (2006.01)
(Continued)

(52) U.S. Cl.
CPC ........ *F21V 5/008* (2013.01); *B29D 11/00403* (2013.01); *B60Q 1/50* (2013.01);
(Continued)

(58) Field of Classification Search
CPC ........ F21V 5/008; F21V 29/70; G09F 13/044; B29D 11/00403; B60Q 1/50
See application file for complete search history.

(56) References Cited

U.S. PATENT DOCUMENTS 7,249,869 B2    7/2007    Takahashi et al.
9,656,598 B1*    5/2017    Salter .................... G02B 6/002
(Continued)

FOREIGN PATENT DOCUMENTS

WO     2020114969 A1     6/2020
WO     2020135379 A1     7/2020

OTHER PUBLICATIONS

International Preliminary Report on Patentability received for PCT Application No. PCT/IB2022/054228, mailed on Nov. 16, 2023, 7 pages.

(Continued)

*Primary Examiner* — Christopher E Dunay

(57) ABSTRACT

An illuminated emblem assembly includes a multi-component outer lens having an exterior surface and an interior surface further comprising an externally visible area to be illuminated, an inner lens having an exterior surface and an interior surface, a printed circuit board assembly, a heat sink, a housing for the inner and outer lenses, and at least one light source, wherein the at least one light source is offset from the externally visible area to be illuminated. A method of manufacturing the illuminated emblem assembly includes injection molding the multi-component outer lens, providing the inner lens, providing the housing for the inner and outer lenses, providing the at least one light source, and assembling the inner and outer lenses and the at least one light source within the housing to obtain the illuminated emblem assembly.

20 Claims, 5 Drawing Sheets

Related U.S. Application Data

(60) Provisional application No. 63/317,428, filed on Mar. 7, 2022, provisional application No. 63/185,964, filed on May 7, 2021.

(51) Int. Cl.

| | | |
|---|---|---|
| *B60Q 1/50* | (2006.01) | |
| *B60R 13/00* | (2006.01) | |
| *F21V 29/70* | (2015.01) | |
| *G09F 13/04* | (2006.01) | |
| *B29K 33/00* | (2006.01) | |
| *F21W 104/00* | (2018.01) | |
| *F21Y 115/10* | (2016.01) | |

(52) U.S. Cl.
CPC ............ *B60R 13/005* (2013.01); *F21V 29/70* (2015.01); *G09F 13/044* (2021.05); *B29K 2033/12* (2013.01); *B29K 2995/0025* (2013.01); *B29K 2995/0026* (2013.01); *B29K 2995/0029* (2013.01); *F21W 2104/00* (2018.01); *F21Y 2115/10* (2016.08)

(56) References Cited

U.S. PATENT DOCUMENTS

| | | | |
|---|---|---|---|
| 2008/0090031 | A1 | 4/2008 | Hirzmann |
| 2017/0101047 | A1* | 4/2017 | Dellock .................... F21K 9/64 |
| 2017/0200403 | A1* | 7/2017 | Salter .................... B60R 13/005 |
| 2019/0001878 | A1* | 1/2019 | Schneider ............. G09F 21/049 |
| 2019/0337446 | A1* | 11/2019 | Salter ...................... F21S 41/50 |
| 2023/0037082 | A1* | 2/2023 | Situ ......................... G09F 21/04 |

OTHER PUBLICATIONS

International Search Report and Written Opinion received for PCT Application No. PCT/IB2022/054228, mailed on Aug. 18, 2022, 08 pages.

Non-Final office action received for U.S. Appl. No. 17/738,064, mailed on Mar. 20, 2023, 11 pages.

\* cited by examiner

ILLUMINATED EMBLEM ASSEMBLIES AND METHODS OF MANUFACTURE

CROSS-REFERENCE TO RELATED APPLICATIONS

This application is a continuation of U.S. Nonprovisional application Ser. No. 17/738,064, filed May 6, 2022, which application further claims priority to and the benefit of U.S. Provisional Application No. 63/185,964, filed on May 7, 2021, and U.S. Provisional Application No. 63/317,428, filed on Mar. 7, 2022. The disclosures of the above-identified applications are all incorporated herein by reference in their respective entireties.

BACKGROUND

This disclosure relates to illuminated displays, more specifically to illuminated emblem assemblies and their methods of manufacture.

Emblems are used to display branding information or other logos on products, such as, but not limited to vehicles. Illumination of an emblem may enhance the visual appearance of an emblem, illuminate the emblem in dark conditions, and/or otherwise draw attention to the emblem. Typical light sources generate light that radiates outwards from the light source. However, a radial illumination pattern may not be desired when the light source is used to illuminate an emblem. Thus, there exists a need for an illuminated emblem assembly with improved homogeneity and luminance and a method of manufacturing the same.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY

According to one aspect of the present disclosure, an illuminated emblem assembly is presented. In one exemplary implementation, the illuminated emblem assembly comprises a multi-component outer lens having an exterior surface and an interior surface further comprising an externally visible area to be illuminated, an inner lens having an exterior surface and an interior surface, a printed circuit board assembly, a heat sink, a housing for the inner and outer lenses, and at least one light source, wherein the at least one light source is offset from the externally visible area to be illuminated. According to another aspect of the present disclosure, a vehicle body component comprising the illuminated emblem assembly and a similar method of manufacture are presented.

In some implementations, the multi-component outer lens is a multi-shot injection molded lens. In some implementations, the materials for the multi-shot injection molded lens include at least black polymethyl methacrylate (PMMA) and clear PMMA. In some implementations, the light source is a light-emitting diode (LED) assembly having one or more LED lights. In some implementations, when the externally visible area to be illuminated comprises circular areas, the light source is radially centered on each circle offset from the externally visible area to be illuminated. In some implementations, when the externally visible area to be illuminated comprises circular areas, the light source comprises at least one light source radially offset from a center of each circle offset from the externally visible area to be illuminated. In some implementations, the at least one light source radially offset from the center of each circle comprises two light sources radially offset from the center of each circle in opposing directions. In some implementations, each circle defines a central elongated or oval-shaped aperture, and wherein the two light sources are radially in directly opposing directions along a central longer axis line of the respective central aperture.

In some implementations, a reflective coating is applied to at least a portion of the interior surface of the outer lens. In some implementations, at least a portion of the interior surface of the outer lens or the exterior surface of the inner lens is grained or textured. In some implementations, the multicomponent outer lens has at least one set of alternating solid and open structures, wherein the amount of light from the light source passing to the area to be illuminated is not materially impacted by any alternating structures. In some implementations, the multi-component outer lens is alternating solid and open circular areas. In some implementations, the alternating solid and open circular areas are interlocked. In some implementations, a plane or a surface of entry points of the light source are not stepped or staggered in relation to the area to be illuminated.

According to another aspect of the present disclosure, a method of manufacturing an illuminated emblem assembly is presented. In one exemplary implementation, the method comprises injection molding a multi-component outer lens having an exterior surface and an interior surface further comprising an externally visible area to be illuminated, providing an inner lens having an exterior surface and an interior surface, providing a housing for the inner and outer lenses, providing at least one light source, wherein the at least one light source is offset from the externally visible area to be illuminated, and assembling the inner and outer lenses and the at least one light source within the housing to obtain the illuminated emblem assembly.

In some implementations, the injection molding of the multi-component outer lens is a multi-shot injection molding process. In some implementations, the multi-shot injection molding process comprises performing a first injection molding shot to form a first opaque portion of the multi-component outer lens, and performing a second injection molding shot before or after the first injection molding shot to form a second translucent or transparent portion of the multi-component outer lens. In some implementations, the materials for the first and second injection molding shots include at least black PMMA and clear PMMA, respectively. In some implementations, the method further comprises providing and assembling a printed circuit board assembly and a heat sink within the housing for controlling/powering and heat management of the at least one light source.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

The present disclosure will become more fully understood from the detailed description and the accompanying drawings, wherein.

Figure 1:
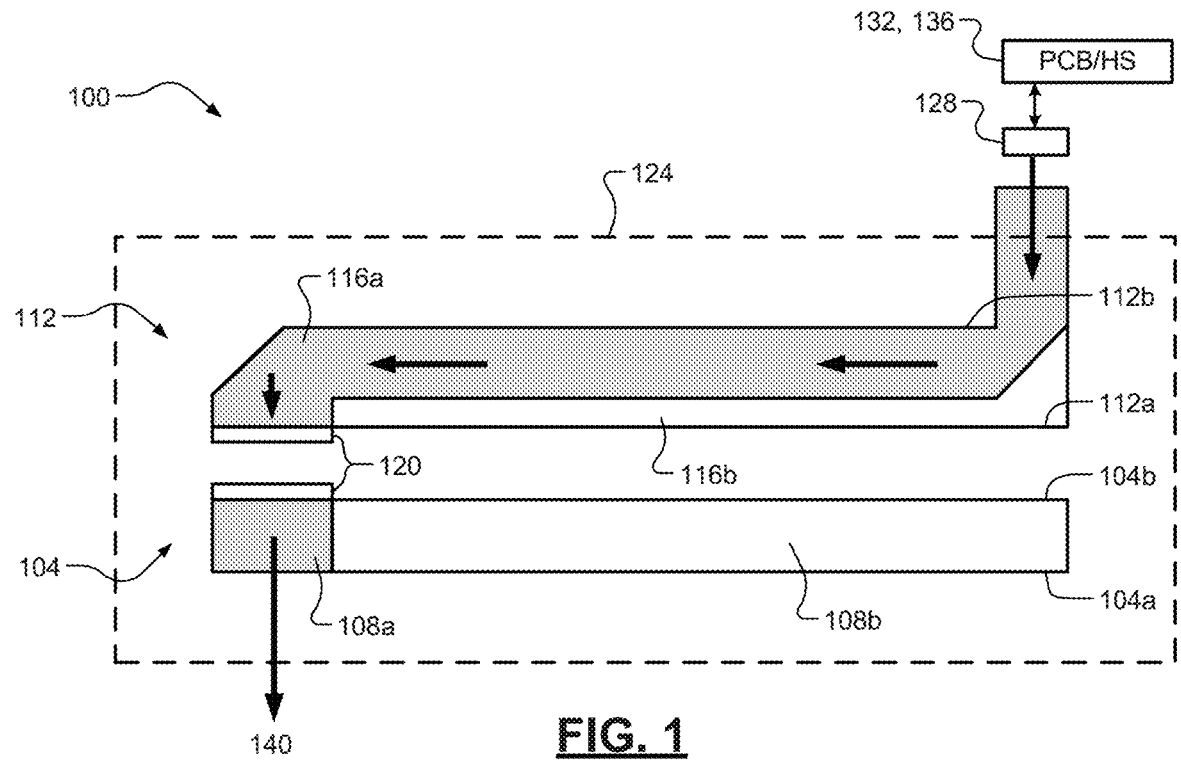
FIG. 1 is a sectional side view of a portion of a first example illuminated emblem assembly using a lower portion of its inner optics for illumination according to some implementations of the present disclosure.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures. However, using the particular arrangement illustrated in the one or more other figures is not required in other embodiments.

DETAILED DESCRIPTION

As previously discussed, emblems are used to display branding information or other logos on products, such as, but not limited to vehicles. Illumination of an emblem may enhance the visual appearance of an emblem, illuminate the emblem in dark conditions, and/or otherwise draw attention to the emblem. Typical light sources generate light that radiates outwards from the light source. However, a radial illumination pattern may not be desired when the light source is used to illuminate an emblem. Thus, there exists a need for an illuminated emblem assembly with improved homogeneity and luminance and a method of manufacturing the same. Accordingly, improved illuminated emblem assemblies and their methods of manufacture are presented herein. The illuminated emblem assemblies provide for improved homogeneity and luminance, and their methods of manufacture provide are simple and efficient. Potential benefits include improved viewing aesthetics and/or reduced manufacturing costs.

Figure 2:
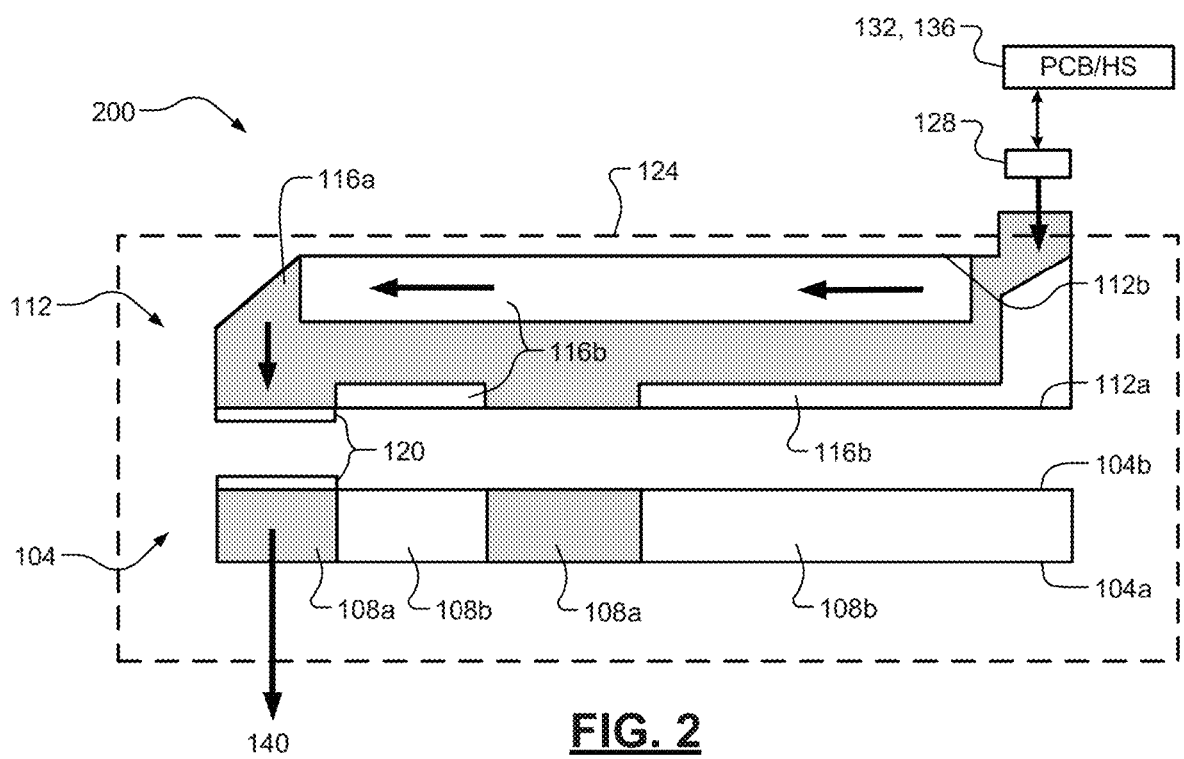
FIG. 2 is a sectional side view of a portion of a second example illuminated emblem assembly using an upper portion of its inner optics for illumination according to some implementations of the present disclosure.
Figure 3:
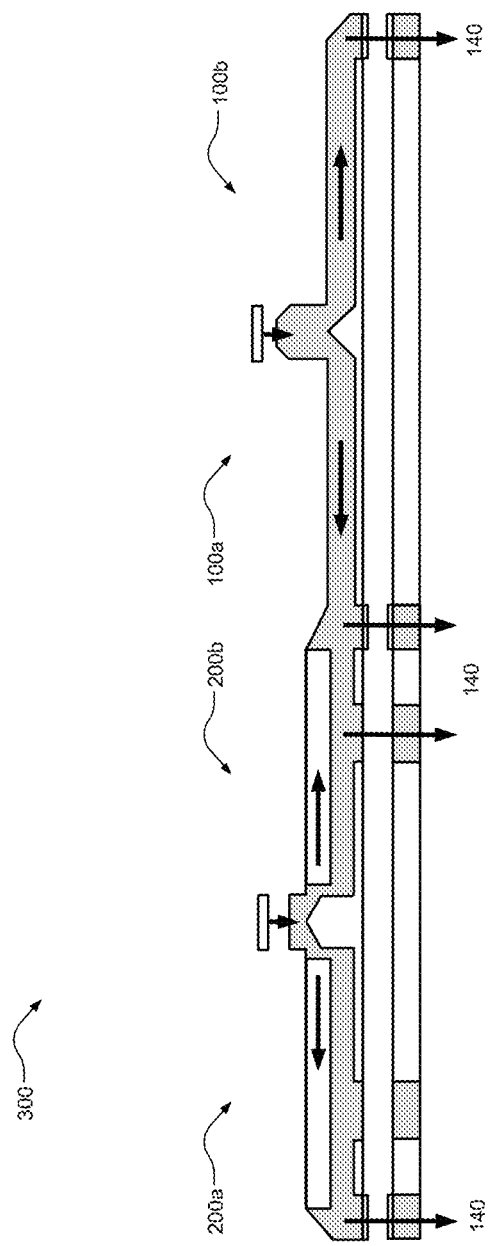
FIG. 3 is a sectional side view of a third example illuminated emblem assembly using a both the lower and upper portions of its inner optics for illumination according to some implementations of the present disclosure.

Referring now to FIGS. 1-3, sectional side views of various examples of an illuminated emblem assembly according to some implementations of the present disclosure are illustrated. More specifically, FIG. 1 is a sectional side view of a portion of a first example illuminated emblem assembly 100 using a lower portion of its inner optics for illumination and FIG. 2 is a sectional side view of a portion of a second example illuminated emblem assembly 200 using an upper portion of its inner optics for illumination, whereas FIG. 3 is a sectional side view of a third example illuminated emblem assembly 300 using both the lower and upper portions of its inner optics for illumination (i.e., a combination of portions 100 and 200, referenced as 100 a, 100 b, 200 a, and 200 b). The illuminated emblem assemblies generally comprise a multi-component outer lens 104 having an exterior surface 104 a and an interior surface 104 b further comprising an externally visible area 140 to be illuminated, an inner lens 112 having an exterior surface 112 a and an interior surface 112 b, a printed circuit board (PCB) assembly 132, a heat sink (HS) 136, a housing 124 for the inner and outer lenses 112, 104, and at least one light source 128, wherein the at least one light source is offset from the externally visible area 140 to be illuminated. In some implementations, the multi-component outer lens is a multi-shot (e.g., two-shot, or 2K) injection molded lens formed of two different materials 108 a. 108 b. In some implementations, the materials for the multi-shot injection molded lens include at least black (e.g., opaque) polymethyl methacrylate (PMMA) and clear (e.g., transparent or translucent) PMMA for materials 108 a, 108 b, respectively.

Figure 4:
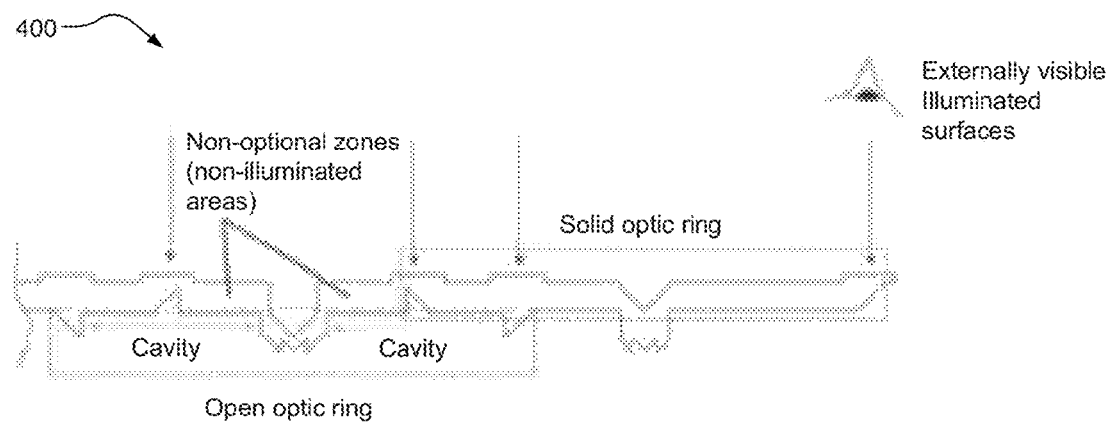
FIG. 4 is a sectional top view of a portion of a fourth example illuminated emblem assembly having illuminated and non-illuminated areas corresponding to solid and open optic rings according to some implementations of the present disclosure.
Figure 5:
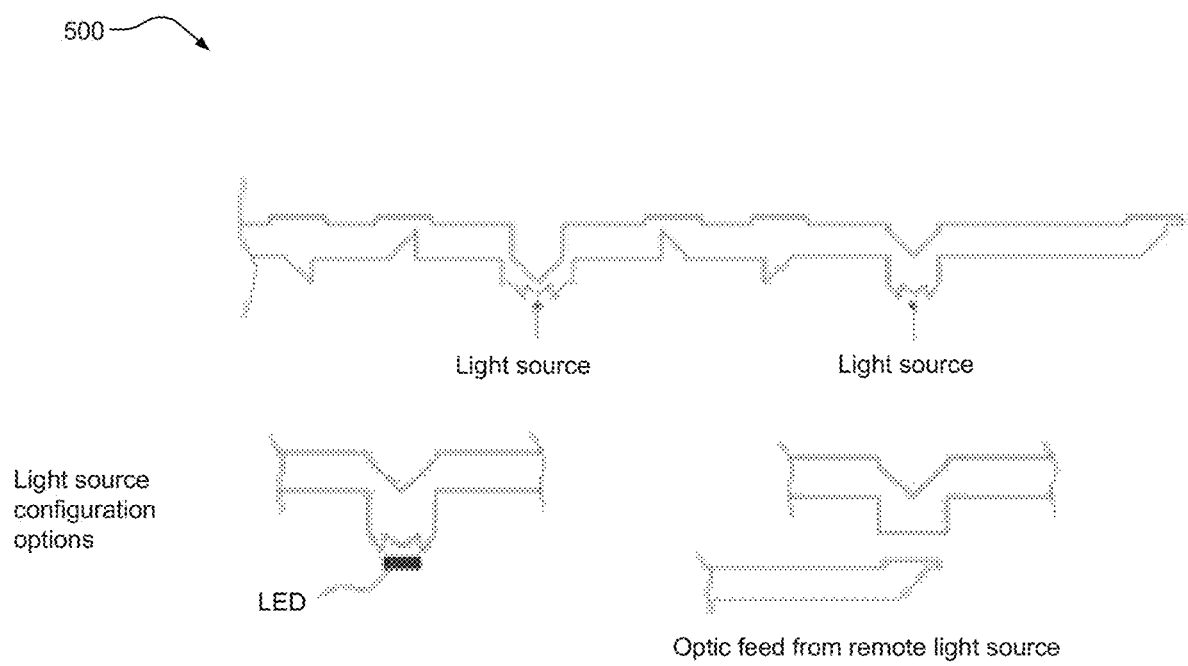
FIG. 5 is a sectional top view of a portion of the fifth example illuminated emblem assembly having different light source configurations according to some implementations of the present disclosure.

Referring now to FIGS. 4-5 and with continued reference to FIGS. 1-3, sectional top views of a portion of a fourth example illuminated emblem assembly 400 having illuminated and non-illuminated areas corresponding to solid and open optic rings and a portion of the fifth example illuminated emblem assembly 500 having different light source configurations according to some implementations of the present disclosure are illustrated. In one exemplary implementation, the light source 128 is a light-emitting diode (LED) assembly having one or more LED lights that is controlled by the PCB assembly 132 and having heat management regulated via the heat sink (HS) 136. A reflective coating may be applied to at least a portion of the interior surface 104 b of the outer lens 104, such as in portions where light is not to be transmissive therethrough as shown. In some implementations, at least a portion of the interior surface 104 b of the outer lens and/or the exterior surface 112 a of the inner lens 112 is grained or textured (see 120). This graining or texturing of these surface(s) can create lighting effects, such as by alternating the diffusiveness of the light passing therethrough.

Figure 6A:
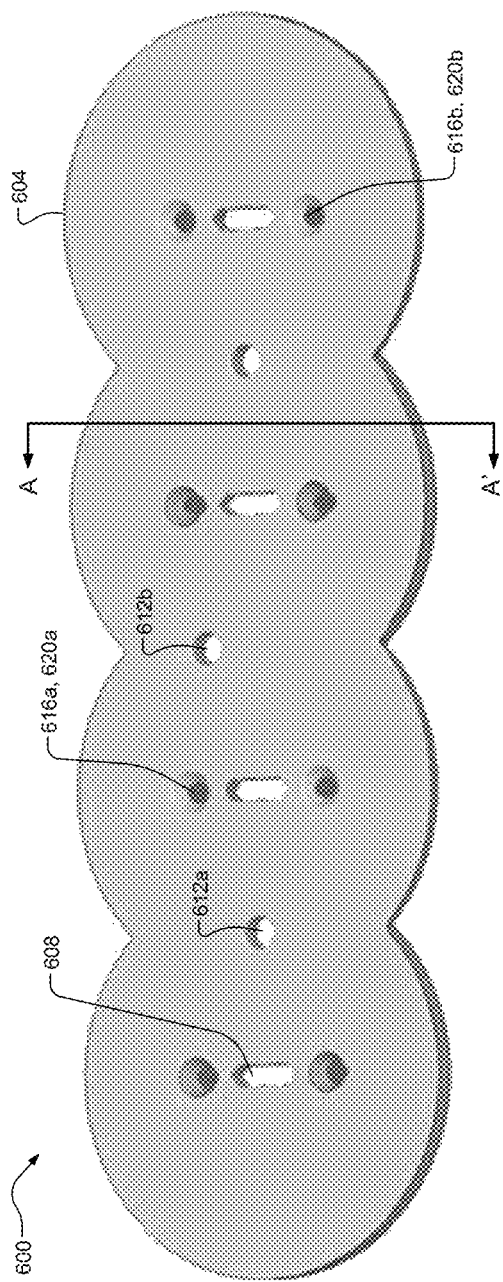
FIGS. 6A-6B are front and cross-sectional (A-A') views of a portion of sixth example illuminated emblem assembly according to some implementations of the present disclosure.
Figure 6B:
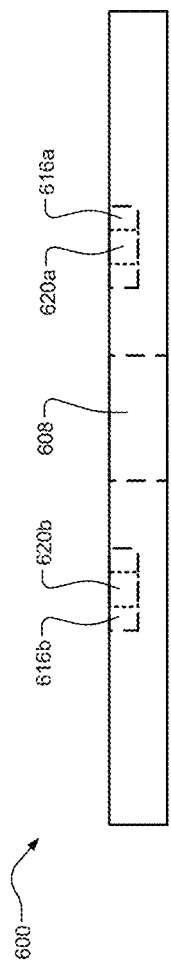

Referring now to FIGS. 6A-6B and with continued reference to the previous FIGS., front and cross-sectional (A-A') views of a portion of sixth example illuminated emblem assembly 600 according to some implementations of the present disclosure are illustrated, when the externally visible area to be illuminated comprises circular areas 604, the light source comprises at least one light source 616 a and/or 616 b radially offset from a center of each circle 604 offset from the externally visible area to be illuminated (i.e., via a central aperture 608) while still achieving the requisite lighting quality demands. This externally visible area to be illuminated could also include non-central apertures 612 a and/or 612 b as shown. In such implementations, the at least one light source radially offset from the center of each circle 604 comprises two light sources 616 a, 616 b radially offset from the center of each circle in opposing directions. In some implementations, the two light sources 616 a, 616 b are radially offset in directly opposing directions in line with and parallel to an elongated length (e.g., along a central axis line of the circumference) relative to a central elongated or oval-shaped aperture 608 as shown in FIG. 6A.

These light sources 616 a, 616 b could be affixed/attached to or integrated into a back or rear surface of the illuminated emblem assembly 600. Each light source 616 a, 616 b, for example, could be an LED recessed in a back surface of the illuminated emblem assembly 600 in respective recessed areas 620 a, 620 b as shown such that the overall profile of the illuminated emblem assembly 600 remains flat or low-profile. In some implementations, the multicomponent outer lens 104 has at least one set of alternating solid and open structures, wherein the amount of light from the light source passing to the area 140 to be illuminated is not materially impacted by any alternating structures (e.g., especially if the alternating structures are superimposed). In some implementations, the multi-component outer lens is alternating solid and open circular areas (see FIG. 4). In some implementations, the alternating solid and open circular areas are interlocked (see FIG. 6). In some implementations, a plane or a surface of entry points of the light source are not stepped or staggered in relation to the area to be illuminated.

In some implementations, the illuminated emblem assembly is part of an automotive or vehicle body component (e.g., attached to or integrated therein). Non-limiting examples of such vehicle body components include grille assemblies, bumpers, side moldings, and rear elements (hatches, trunk lid finishers, etc.). While exterior vehicle body components are specifically discussed, it will be appreciated that these systems and methods (see below) could be applicable to other automotive components, such as interior vehicle components.

Figure 7:
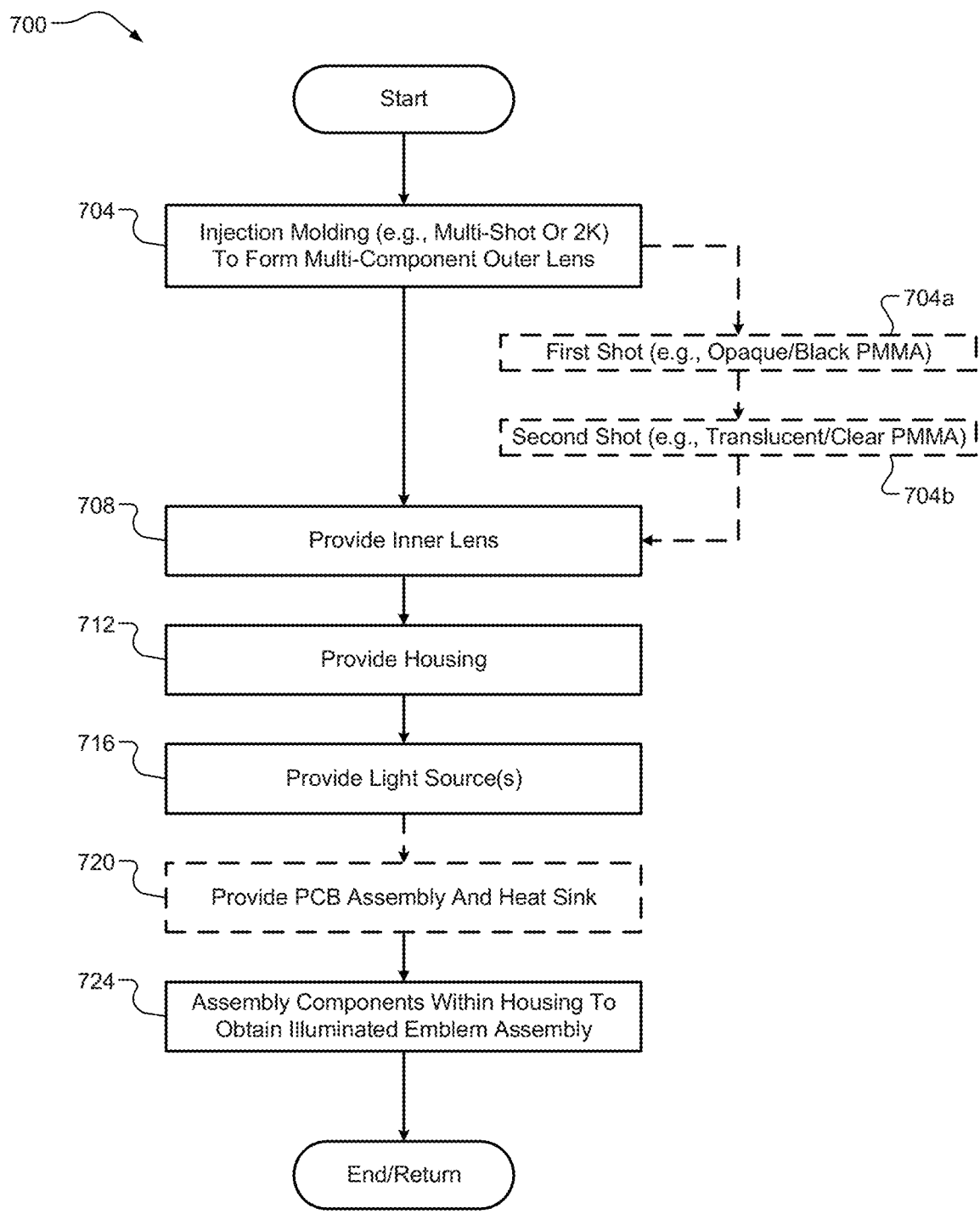
FIG. 7 is a flow diagram of an example method of manufacturing an illuminated emblem assembly according to some implementations of the present disclosure.

Referring now to FIG. 7, a flow diagram of an example method 700 of manufacturing an illuminated emblem assembly (e.g., assembly 100/200/300) according to some embodiments of the present application is illustrated. At 704, injection molding of a multi-component outer lens having an exterior surface and an interior surface further comprising an externally visible area to be illuminated is performed. This could include, for example, a multi-shot injection molding process, such as performing a first injection molding shot at 704 a to form a first opaque portion of the multi-component outer lens and performing a second injection molding shot 704 b before or after the first injection molding shot 704 a to form a second translucent or transparent portion of the multi-component outer lens. As previously discussed, the materials for the first and second injection molding shots include at least black PMMA and clear PMMA, respectively, but it will be appreciated that other suitable materials could be utilized.

While not shown as a separate step, it will be appreciated that the multi-component outer lens could be removed from a mold after the injection molding process. At 708, an inner lens having an exterior surface and an interior surface is provided. At 712, a housing for the inner and outer lenses is provided. At 716, at least one light source offset from the externally visible area to be illuminated is provided. Lastly, at 724, the inner and outer lenses and the at least one light source are assembly within the housing to obtain the illuminated emblem assembly (e.g., assembly 100 and/or 200). At optional intermediary step 720, a PCB assembly and a heat sink could be provided and also assembled within the housing for controlling/powering and heat management of the at least one light source. The method 700 then ends or returns to 704 for one or more additional manufacturing cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An illuminated housing comprising:
   an elongate multi-component outer lens having an exterior surface and an interior surface that extend along a longitudinal axis of the elongate multi-component outer lens, the interior surface further comprising an externally visible area to be illuminated;
   an elongate inner lens having an exterior surface and an interior surface that extend along a longitudinal axis of the elongate inner lens, the longitudinal axis of the inner lens being parallel to the longitudinal axis of the elongate multi-component outer lens, such that no surfaces of the outer and inner lenses lie in a single longitudinally-oriented plane; and at least one light source offset from the externally visible area to be illuminated.

2. The illuminated housing of claim 1, wherein the multi-component outer lens is a multi-shot injection molded lens.

3. The illuminated housing of claim 2, wherein the materials for the multi-shot injection molded lens include at least black polymethyl methacrylate (PMMA) and clear PMMA.

4. The illuminated housing of claim 1, wherein the light source is a light-emitting diode (LED) assembly having one or more LED lights.

5. The illuminated housing of claim 1, wherein when the externally visible area to be illuminated comprises circular areas, the light source is radially centered on each circle offset from the externally visible area to be illuminated.

6. The illuminated housing of claim 1, wherein when the externally visible area to be illuminated comprises circular areas, the light source comprises at least one light source radially offset from a center of each circle offset from the externally visible area to be illuminated.

7. The illuminated housing of claim 6, wherein the at least one light source radially offset from the center of each circle comprises two light sources radially offset from the center of each circle in opposing directions.

8. The illuminated housing of claim 7, wherein each circle defines a central elongated or oval-shaped aperture, and wherein the two light sources are radially in directly opposing directions along a central longer axis line of the respective central aperture.

9. The illuminated housing of claim 1, wherein a reflective coating is applied to at least a portion of the interior surface of the outer lens.

10. The illuminated housing of claim 1, wherein at least a portion of the interior surface of the outer lens or the exterior surface of the inner lens is grained or textured.

11. The illuminated housing of claim 1, wherein the multicomponent outer lens has at least one set of alternating solid and open structures, wherein the amount of light from the light source passing to the area to be illuminated is not materially impacted by any alternating structures.

12. The illuminated housing of claim 11, wherein the multi-component outer lens is alternating solid and open circular areas.

13. The illuminated housing of claim 1, wherein a plane or a surface of entry points of the light source are not stepped or staggered in relation to the area to be illuminated.

14. A vehicle body component comprising the illuminated housing of claim 1.

15. A method of manufacturing an illuminated housing, the method comprising:
providing an elongate multi-component outer lens having two or more surfaces that extend along a longitudinal axis of the elongate multi-component outer lens, one of the two or more surfaces having an externally visible area to be illuminated;
providing an elongate inner lens having two or more surfaces extending along a longitudinal axis parallel to the longitudinal axis of the elongate multi-component outer lens, such that no surfaces of the outer and inner lenses lie in a single longitudinally-oriented plane;
providing at least one light source offset from the externally visible area to be illuminated; and
positioning the inner and outer lenses and the at least one light source within a housing to obtain the illuminated housing.

16. The method of claim 15, wherein the multi-component outer lens is formed via a multi-shot injection molding process.

17. The method of claim 16, wherein the multi-shot injection molding process comprises:
performing a first injection molding shot to form a first opaque portion of the multicomponent outer lens; and
performing a second injection molding shot before or after the first injection molding shot to form a second translucent or transparent portion of the multi-component outer lens.

18. The method of claim 17, wherein the materials for the first and second injection molding shots include at least black polymethyl methacrylate (PMMA) and clear PMMA, respectively.

19. An illuminated lens assembly comprising:
an elongate multi-component outer lens having an exterior surface and an interior surface that extend along a longitudinal axis of the elongate multi-component outer lens, the interior surface further comprising an externally visible area to be illuminated; and
an elongate inner lens having an exterior surface and an interior surface that extend along a longitudinal axis of the elongate inner lens, the longitudinal axis of the inner lens being parallel to the longitudinal axis of the elongate multi-component outer lens, such that no surfaces of the outer and inner lenses lie in a single longitudinally-oriented plane.

20. The illuminated lens assembly of claim 19, further comprising at least one light source offset from the externally visible area to be illuminated.

* * * * *